United States Patent [19]

Galhotra

[11] Patent Number: 4,949,594
[45] Date of Patent: Aug. 21, 1990

[54] INTERAXLE DIFFERENTIAL FOR FULL TIME ALL WHEEL DRIVE SYSTEM

[75] Inventor: Ashwani K. Galhotra, Detroit, Mich.

[73] Assignee: Ford Motor Company, Dearborn, Mich.

[21] Appl. No.: 331,202

[22] Filed: Mar. 31, 1989

[51] Int. Cl.[5] .............................................. F16H 35/04
[52] U.S. Cl. ...................................... 74/650; 180/233; 180/248; 180/247
[58] Field of Search .................. 74/650; 180/233, 247, 180/248, 251

[56] References Cited

U.S. PATENT DOCUMENTS

| | | | |
|---|---|---|---|
| 1,238,659 | 8/1917 | Ford | 74/650 |
| 2,060,558 | 12/1935 | Lavaud | 74/650 |
| 2,179,923 | 5/1938 | Lavaud | 74/650 |
| 4,400,996 | 8/1983 | Schou | 74/650 |
| 4,709,775 | 12/1987 | Watanabe et al. | 74/866 X |
| 4,768,602 | 9/1988 | Inoue et al. | 180/233 X |
| 4,846,298 | 7/1989 | Naito | 180/233 |

FOREIGN PATENT DOCUMENTS

| | | | |
|---|---|---|---|
| 0046713 | 2/1987 | Japan | 180/247 |
| 0176724 | 7/1988 | Japan | 180/248 |

*Primary Examiner*—Dirk Wright
*Attorney, Agent, or Firm*—Frank G. McKenzie; Donald J. Harrington

[57] ABSTRACT

A transfer case for a vehicle having full time four-wheel drive includes an interaxle differential connected to the output of a transmission and driving coaxial driveshafts, each connected to a different axleshaft. One of the driveshafts supports a chain sprocket driveably connected by a chain belt to a driveshaft coaxial with the input shaft and output drive shafts. The differential includes a center driving disc, a housing connected to the input, two friction disc clutches each connected to one of the output driveshafts, driven discs connected to input pressure plates associated with each of the disc clutches, a ball drive assembly for engaging and disengaging the friction disc according to the relative angular position of the pressure plates, and a coiled compression spring urging the clutches to an engaged state.

3 Claims, 3 Drawing Sheets

INTERAXLE DIFFERENTIAL FOR FULL TIME ALL WHEEL DRIVE SYSTEM

BACKGROUND OF THE INVENTION

1. Field of the Invention

This invention pertains to the field of power transmission systems for motor vehicles especially to such systems that sense a speed difference between driveshafts, transmit power to the slower driveshaft alone, and allow the faster driveshaft to overrun.

2. Description of the Prior Art

In a conventional differential mechanism, either an interaxle differential or interwheel differential, if traction of the outputs is unequal, i.e., if friction contact with ground is less than required to maintain driving contact with ground, then maximum torque transmitted to ground is twice the torque that can be transmitted to the output having the lesser traction.

The gearless, interwheel differential described in U.S. Pat. No. 1,238,659 transmits power between an input shaft, connected to the differential by mating bevel gears, and to axleshafts directed perpendicular to the input shafts. The patent describes use of the differential to drive axleshafts through frictional contact between an input member, driven by the bevel gearset, and friction plates, fixed to the axleshafts and forced into frictional contact with the input member. When one axleshaft turns faster than the other, e. g., while the motor vehicle is turning, frictional contact between the input member and the friction plate connected to the faster axleshaft is removed by displacing driving balls to a position that reduces frictional contact pressure between the input and the faster axleshaft.

The disc differentials described in U.S. Pat. No. 2,060,558 and U.S. Pat. No. 2,179,923 include friction disc clutches for driveably connecting an input to the differential and two axleshafts, extending perpendicular to the differential input and directed away from the differential to the drive wheels of the vehicle. A coiled helical compression spring maintains frictional contact among the discs of the clutches. When the speed of one of the axleshafts increases with respect to the other, the friction clutch associated with the faster axleshaft is disengaged, thereby disconnecting that axleshaft from the input. In this condition, the slower axleshaft receives all the torque through its associated friction clutch from the differential input. Here again, as in U.S. Pat. No. 1,238,659, the differential is an interwheel differential, which transmits power transversely along the axleshafts perpendicular to the driving input The positive clutch differential described in U.S. Pat. No. 4,400,996 is also an interwheel differential transmitting power from a longitudinally directed input bevel gear, through operation of positive friction clutches to transversely directed coaxial shafts directed perpendicular to the differential input. The axleshafts are connected by pressure rings having inclined friction surfaces to a casing, driven rotatably by a bevel pinion. The differential includes a balking ring to prevent immediate reengagement in the event one pressure ring becomes disengaged from the input when its associated axleshaft is overrunning with respect to the other axleshaft.

SUMMARY OF THE INVENTION

An interaxle differential transmits power differentially between a power input and two driveshafts. Front and rear axleshafts drive differentially, through an interwheel differential connected to a corresponding driveshaft and wheels on the axleshafts supported on ground. Through operation of a set of mating bevel pinions and side bevel gears fixed to the axleshafts each interwheel differential senses loss by the wheels of functional contact with ground and then transmits power to the overrunning or slipping wheel.

A conventional interaxle differential connects the power input to the driveshaft associated with the spinning wheel and disconnects the power input from the driveshaft associated with the traction wheels. A gearless interaxle differential according to this invention accomplishes the inverse result, i.e., power is transmitted only to the non-slipping wheels, with a minimum number of components, reliably and at low cost.

A transfer case for a vehicle having full time four-wheel drive includes an interaxle differential connected to the output of a transmission and driving coaxial driveshafts, each connected to a different axleshaft. One of the driveshafts supports a chain sprocket driveably connected by a chain belt to a shaft coaxial with the input shaft and output drive shafts. The differential includes a center driving disc, a housing connected to the input, two friction disc clutches each connected to one of the output driveshafts, driven discs connected to input pressure plates associated with each of the disc clutches, a ball drive assembly for engaging and disengaging the friction disc according to the relative angular position of the pressure plates, and a coiled compression spring urging the clutches to an engaged state.

DETAILED DESCRIPTION OF THE PREFERRED EMBODIMENT

Figure 1:
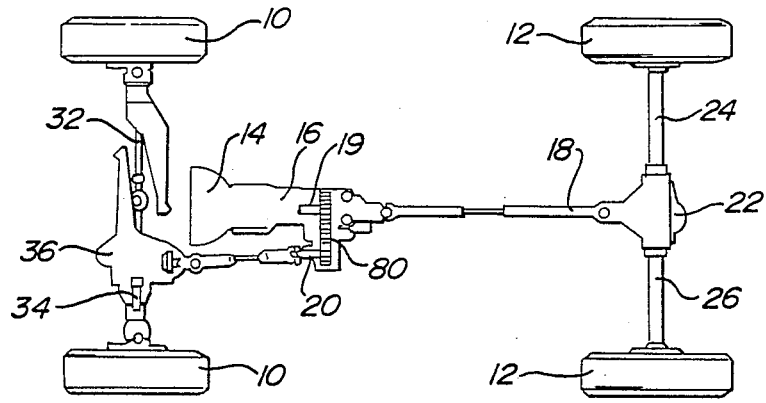
FIG. 1 is a plan view of a four-wheel drive system showing a transmission, axleshafts, wheels and transfer case.
Figure 3:
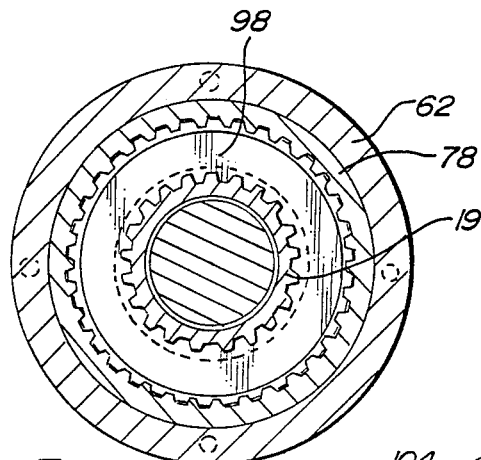
FIG. 3 is a cross section taken in plane 3—3 of FIG. 2.

Referring first to FIG. 1, a full time four-wheel drive vehicle includes front and rear sets of wheels 10, 12, an automatic or manual transmission 14 driven by an engine for producing multiple forward and reverse speed ratios, and a transfer case 16 driveably connecting the transmission output to a rear driveshaft 18 and a front driveshaft 20. Shaft 18 transmits power to a rear interwheel differential 22, from which power is transmitted to the rear wheels 12 through axleshafts 24, 26. The front wheels 10 are driveably connected to righthand and lefthand axleshafts 32, 34, to which power is transmitted from the front driveshaft through a front interwheel differential 36.

Figure 6:
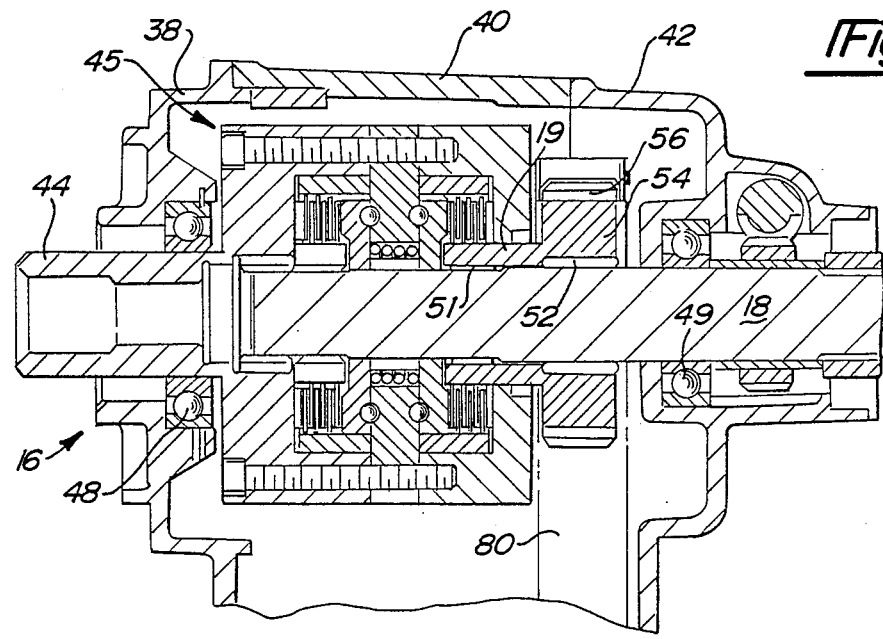
FIG. 6 is a partial cross section of a transfer case taken at a horizontal plane through the axis of the input shaft and output drive shafts.

Referring now to FIG. 6, transfer case 16 includes a casing of three parts 38, 40 and 42 joined mechanically at flange surfaces. The transmission output shaft is driveably connected to input shaft 44 of interaxle differential 45, located within the transfer case. Differential 45 connects shaft 44 to rear driveshaft 18 and first driveshaft 19. Shaft 44 is supported on bearing 48, fitted within cover 38. Rear output shaft 18 is rotatably supported by bearing 49, carried on cover 42.

First driveshaft 19, supported by bearings 51, 52 on the outer surface of rear driveshaft 18, carries drive sprocket 54 having teeth 56 in continuous engagement with an endless, flexible chain belt 80, which is engaged also with teeth 82 of a driven sprocket wheel 84, splined to shaft 86. FIG. 2B of U.S. Pat. No. 4,632,207 shows the lower half of the transfer case, particularly, the drive relationship among forward driveshaft 20, chain belt 80, sprocket wheel 84, shaft 86 and Cardan joint 120. The entire disclosure of that patent is herein incorporated by reference.

Figure 2:
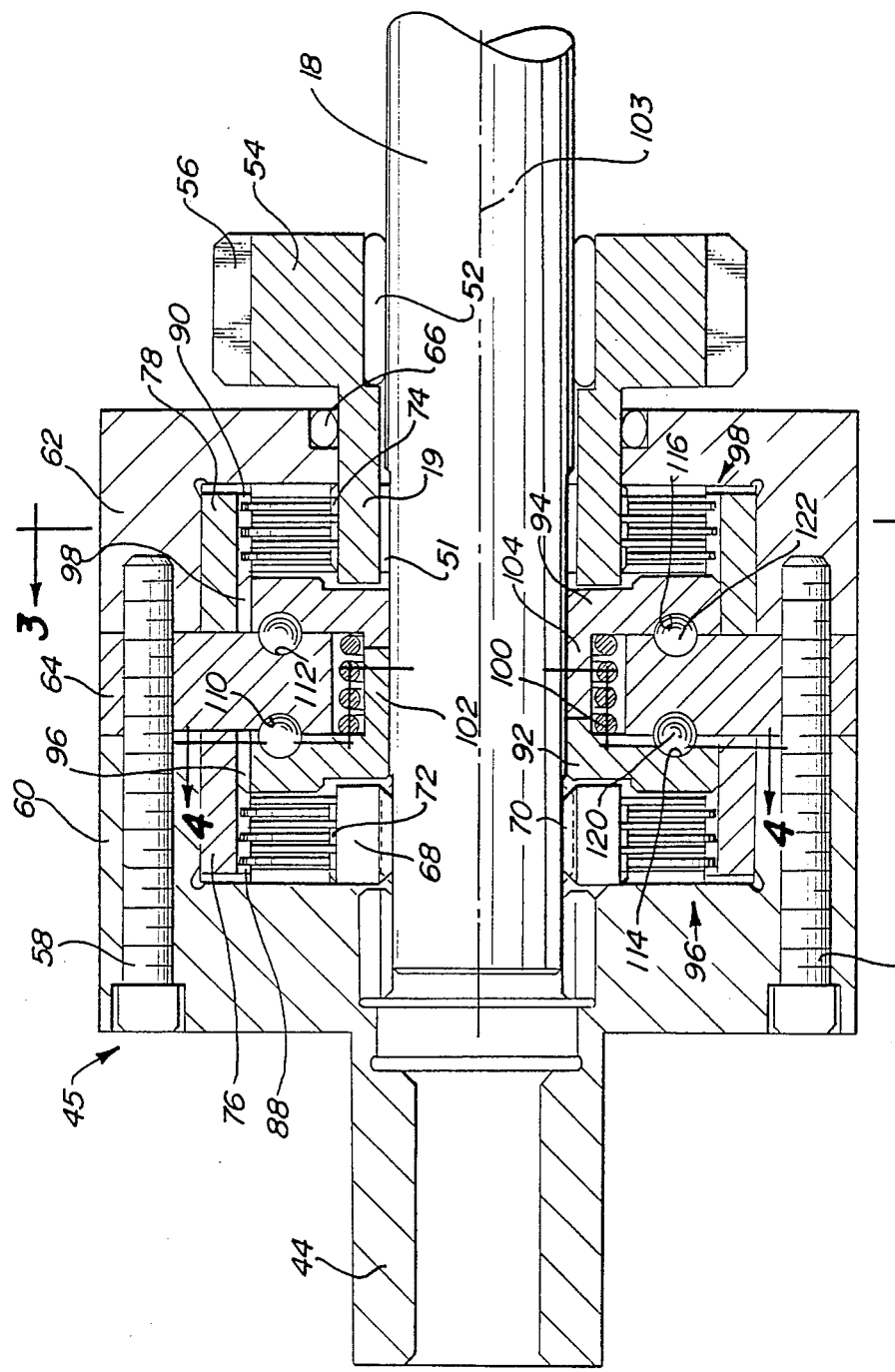
FIG. 2 is a cross section through a central plane of a gearless, interaxle differential according to this invention.
Figure 5:
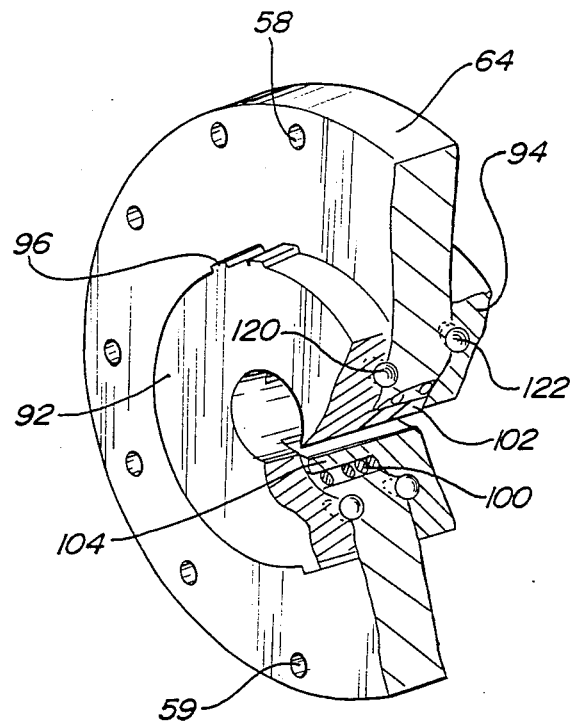
FIG. 5 is a perspective view of the central portion of the differential of FIG. 1.

Referring now to FIG. 2, interaxle disc differential 45 includes input shaft 44, casings 60, 62 and central disc 64, joined as a unit by mechanical attachments 58, 59. Rear driveshaft 18 and first driveshaft 19 are supported rotatably on bearings 51, 52 and are aligned coaxially with input shaft 44. Seal 66 prevents passage of hydraulic fluid and entrance of contaminants within the space defined by the casings.

Driveshaft 18 carries a sleeve 68, splined to the shaft at 70 and having splines on its external surface at 72. Similarly, first shaft 19 has splines on its external surface 74. Outer sleeves 76, 78 carry splines 88, 90 on their radially inner surfaces, respectively. Sleeves 76, 78 can be formed integrally with discs 92, 94, respectively, or joined to the corresponding disc by a spline connection.

Friction clutch 96, driveably connecting sleeve 76 to the rear driveshaft, includes a first set of friction discs connected by splines 88 to the inner surface of sleeve 76, and a second set of friction discs, each disc alternating with a disc of the first set, connected at spline 72 to sleeve 68. Clutch 98 includes a first set of friction discs connected by spline 90 to sleeve 78 and a second set of friction discs, each disc alternating with a disc of the first set, connected at spline 74 to the outer surface of first shaft 19. Clutch 98 driveably connects sleeve 78 to shaft 19. A hydraulic pump and passages circulating hydraulic fluid, such as those described in U.S. Pat. No. 4,632,207, through or adjacent clutches 96, 98 to conduct away heat developed there by friction may be included.

A coiled compression spring 100, located between the inner surface of pressure plates 92, 94, maintains continuous pressure on the plates forcing the clutch discs of each friction clutch into mutual contact, thereby causing the clutches to transmit a low magnitude of torque between the pressure plates and the corresponding shafts. The magnitude of torque transmitted by clutches 96, 98 is substantially increased over the torque transmitted due to the spring force as angular position of the pressure plates about central axis 103 changes with respect to the angular position of central disc 64.

Figure 7:
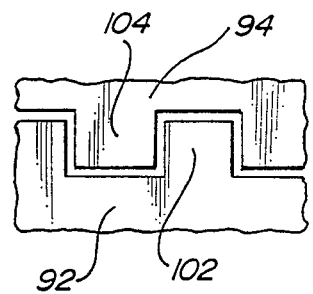
FIG. 7 is a cross section taken at plane 7—7 of FIG. 4 showing interlocking portions of the pressure plates.

Pressure rings 92, 94 are mutually connected by interlocking axially extending shoulders 102, 104 which prevent, subject to predetermined angular clearance between the shoulders, unobstructed angular displacement between the pressure rings. For example, FIG. 7 shows axial and angular clearance between shoulders 102 and 104. The angular clearance is taken up before the torque capacity of clutches 96, 98 is increased through action of the corresponding pressure rings 92, 94. Compression spring 100 is fitted within a recess defined by the outer surfaces of shoulders 102 and 104 and the inner diameter of central disc 64.

Figure 4:
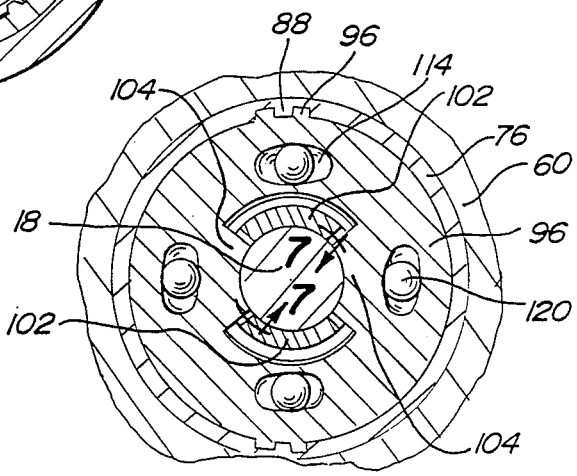
FIG. 4 is a cross section taken in plane 4—4 of FIG. 2.

Referring now to FIGS. 2 and 4, recesses 110, 112, formed on opposite axial faces of central disc 64, and complementary recesses 114, 116, formed on the adjacent face of pressure rings 92, 94, combine to form recesses in which ball 120, associated with pressure plate 92, and ball 122, associated with pressure plate 94, are located. The recesses and the balls are distributed angularly about axis 102, as FIG. 4 shows.

The surfaces of recess pairs 110, 114 and 112, 116 are deepest at the angular center of the recesses, are inclined axially, and become shallower progressively at their angular extremities. These surfaces are cam surfaces which receive balls 120 and 122 at the center of the recess and, in that position, cause substantially no force to develop between disc 64 and the respective pressure plates. When the balls are located away from the recess centers, the cam surfaces move the balls axially and force the pressure plates away from disc 64.

In operation, input shaft 44 drives housing 60, 62 and central disc 64 due to the mechanical connection among them. First driveshaft 19 and rear driveshaft 18, due to frictional contact of the driving wheels with ground, initially tend to remain stationary until a sufficient angular displacement of pressure plates 92, 94 relative to central disc 64 occurs. Then balls 120, 122 roll on the cams surface from the deeper portion of the recess to the shallower portion, thereby moving axially between the central disc and the corresponding pressure plate. This axial movement forces the corresponding pressure plate against the discs of the corresponding friction clutch 96, 98. As the torque capacity transmitted by the clutches increases, shafts 18, 19 are driven by the clutches from input shaft 44.

Interwheel differentials 22, 36 transmit torque differentially to the drive wheels. Therefore, when either of the drive wheels of the forward or rearward axleshafts looses frictional contact with the ground, thereby substantially removing reaction torque from the corresponding output shaft 18, 19. The associated pressure plate turns without resistance with disc 64. In this condition, the driving balls of the slipping wheels move toward the center of the cam surfaces, relieve driving contact with the associated pressure plate, and reduce the torque capacity of the clutch. But reaction torque on the other output shaft maintains the driving balls associated with the traction output shaft at a shallow position in the corresponding recesses. Tight frictional engagement between the discs of the corresponding friction clutch and the pressure plate is maintained due to the axial position of the driving balls at a shallow position on the cam surface of the pressure plate associated in the traction output shaft. As a result, substantially all of the torque is transmitted from input shaft 44 through the friction clutch corresponding to the traction drive shaft, whose driving wheels are maintained in frictional contact with the ground. The other output shaft is then free.

When the slipping drive wheels again acquire frictional contact with ground, reaction torque is reapplied to the associated drive shaft. This causes the corresponding pressure plate to rotate with respect to disc 64, first due to torque developed in the corresponding clutch due to the force of spring 100, and later due to movement of the driving balls from the center of the arm surfaces to the shallowest regions. This forces the associated pressure plate into frictional contact with the discs of the associated friction clutch. Thereafter, the clutches transmit substantially equal torque from the input shaft to the corresponding driveshafts.

Having described the preferred embodiment of my invention, what I claim and desire to secure by U.S. Letters Patent is:

1. A driveline for a full-time four wheel drive motor vehicle, comprising:
   front axleshafts and rear axleshafts;
   a first driveshaft;
   a front driveshaft;
   a rear driveshaft coaxial with the first driveshaft;
   front interwheel differential means for differentially driveably connecting the front axleshafts to the front driveshaft;
   rear interwheel differential means for differentially driveably connecting the rear axleshafts to the rear driveshaft;
   a transfer case rotatably supporting the front and rear driveshafts and the first driveshaft, including means for driveably connecting the first driveshaft and front driveshaft;
   an interaxle differential mechanism located in said transfer case, including:
      an input shaft coaxial with the first driveshaft and rear driveshaft;
      first clutch means for driveably engaging and disengaging the first driveshaft and the input shaft;
      second clutch means for driveably engaging and disengaging the rear driveshaft and the input shaft;
      means for continually urging engagement of the first and second clutch means;
      actuator means for varying, in accordance with the magnitude of rotational displacement of the first driveshaft relative to the rear driveshaft, the magnitude of torque transmitted by the first clutch means and second clutch means;
      a first pressure plate located between the actuator means and the first clutch means driveably connected to the first driveshaft;
      a second pressure plate located between the actuator means and the second clutch means, driveably connected to the rear driveshaft;
      means for driveably connecting mutually the first and second pressure plates when a predetermined magnitude of angular displacement of the first pressure plate relative to the second pressure plate is exceeded;
   and wherein the actuator means includes:
      a central disc located between the first and second pressure plates, driveably connected to the input shaft, defining with the first pressure plate a first set of recesses and cam surfaces distributed about said common axis, and defining with the second pressure plate a second set of recesses and cam surfaces distributed about said common axis; and
      first and second sets of driving balls located in the first and second sets of recesses, respectively, forced by contact with the cam surfaces against the corresponding pressure plates as the magnitude of rotational displacement of the first driveshaft relative to the rear driveshaft changes from a reference.

2. A transfer case for transmitting power differentially between a transmission output shaft and two outputs, comprising:
   a first driveshaft;
   a front driveshaft;
   a rear driveshaft coaxial with the first driveshaft;
   means for driveably connecting the first driveshaft and front driveshaft;
   an interaxle differential mechanism including
      an input shaft coaxial with the first driveshaft and rear driveshaft;
      first clutch means for driveably engaging and disengaging the first driveshaft and the input shaft;
      second clutch means for driveably engaging and disengaging the rear driveshaft and the input shaft;
      means for continually urging engagement of the first and second clutch means;
      actuator means for varying, in accordance with the magnitude of rotational displacement of the first driveshaft relative to the rear driveshaft, the magnitude of torque transmitted by the first clutch means and second clutch means;
      a first pressure plate located between the actuator means and the first clutch means, driveably connected to the first driveshaft;
      a second pressure plate located between the actuator means and the second clutch means, driveably connected to the rear driveshaft and driveably connected to the first pressure plate;
      means for driveably connecting mutually the first and second pressure plates when a predetermined magnitude of angular displacement of the first pressure plate relative to the second pressure plate is exceeded;
   wherein the actuator means includes:
      a central disc located between the first and second pressure plates, driveably connected to the input shaft, defining with the first pressure plate a first set of recesses and cam surfaces distributed about said common axis, and defining with the second pressure plate a second set of recesses and cam surfaces distributed about said common axis; and
      first and second sets of driving balls located in the first and second sets of recesses, respectively, forced by contact with the cam surfaces against the corresponding pressure plates as the magnitude of rotational displacement of the first driveshaft relative to the rear driveshaft changes from a reference.

3. An interaxle differential for differentially driveably connecting two output shafts and an input shaft, comprising:
   a first driveshaft;
   a rear driveshaft coaxial with the first driveshaft;
   an input shaft coaxial with the first driveshaft and rear driveshaft;
   first clutch means for driveably engaging and disengaging the first driveshaft and the input shaft;
   second clutch means for driveably engaging and disengaging the rear driveshaft and the input shaft;
   means for continually urging engagement of the first and second clutch means;
   actuator means for varying, in accordance with the magnitude of rotational displacement of the first driveshaft relative to the rear driveshaft, the magnitude of torque transmitted by the first clutch means and second clutch means;

a first pressure plate located between the actuator means and the first clutch means, driveably connected to the first driveshaft;

a second pressure plate located between the actuator means and the second clutch means, driveably connected to the rear driveshaft and driveably connected to the first pressure plate;

means for driveably connecting mutually the first and second pressure plates when a predetermined magnitude of angular displacement of the first pressure plate relative to the second pressure plate is exceeded;

wherein the actuator means includes:

a central disc located between the first and second pressure plates, driveably connected to the input shaft, defining with the first pressure plate a first set of recesses and cam surfaces distributed about said common axis, and defining with the second pressure plate a second set of recesses and cam surfaces distributed about said common axis; and first and second sets of driving balls located in the first and second sets of recesses, respectively, forced by contact with the cam surfaces against the corresponding pressure plates as the magnitude of rotational displacement of the first driveshaft relative to the rear driveshaft changes from a reference.

* * * * *